(12) United States Patent
Tanaka et al.

(10) Patent No.: US 8,329,342 B2
(45) Date of Patent: Dec. 11, 2012

(54) ANODE MATERIAL FOR LITHIUM SECONDARY BATTERIES AND LITHIUM SECONDARY BATTERIES

(75) Inventors: Akihide Tanaka, Hitachinaka (JP); Hidetoshi Honbou, Hitachinaka (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 677 days.

(21) Appl. No.: 12/500,914

(22) Filed: Jul. 10, 2009

(65) Prior Publication Data

US 2010/0009260 A1 Jan. 14, 2010

(30) Foreign Application Priority Data

Jul. 11, 2008 (JP) .................................. 2008-180860

(51) Int. Cl.
 *H01M 4/13* (2010.01)
 *H01M 4/58* (2010.01)
 *H01M 4/60* (2006.01)
(52) U.S. Cl. ........................ 429/231.8; 429/213; 429/212
(58) Field of Classification Search ............... 429/231.8, 429/213, 212
See application file for complete search history.

(56) References Cited

U.S. PATENT DOCUMENTS

| 5,340,670 | A | * | 8/1994 | Takami et al. | 429/331 |
| 7,887,772 | B2 | * | 2/2011 | Jo et al. | 423/447.1 |
| 2007/0009801 | A1 | * | 1/2007 | Inagaki et al. | 429/231.95 |
| 2008/0145757 | A1 | * | 6/2008 | Mah et al. | 429/219 |
| 2009/0297953 | A1 | * | 12/2009 | Shimizu et al. | 429/231.95 |

FOREIGN PATENT DOCUMENTS

| JP | 09-007597 | 1/1997 |
| JP | 2003-272625 | 9/2003 |

* cited by examiner

*Primary Examiner* — Helen O Conley
(74) *Attorney, Agent, or Firm* — Antonelli, Terry, Stout & Kraus, LLP.

(57) ABSTRACT

The present invention is to provide a lithium ion secondary battery that realizes to raise an initial charge and discharge efficiency without deteriorating its charge and discharge characteristic in comparison with the conventional technology.
A carbon material and a lithium ion secondary battery using the carbon material as the anode material, wherein the face interval $d_{002}$ of the carbon material determined by an X ray diffraction apparatus is not less than 0.340 nm and not more than 0.370 nm, and further, V1/V2 representing a ratio of a volume V1 of pores having diameters from not less than 1 nm to less than 10 nm in the carbon material with respect to a volume V2 of pores having diameters from not less than 10 nm to less than 100 nm therein is not more than 0.2.

9 Claims, 1 Drawing Sheet

ANODE MATERIAL FOR LITHIUM SECONDARY BATTERIES AND LITHIUM SECONDARY BATTERIES

CLAIM OF PRIORITY

The present application claims priority from Japanese Patent Application No. 2008-180860 filed on Jul. 11, 2008, the content of which is hereby incorporated by reference into this application.

BACKGROUND OF THE INVENTION

1. Field of the Invention

The present invention relates to an anode material for lithium secondary batteries and lithium secondary batteries.

2. Description of the Related Art

Since a lithium secondary battery is light weight and possesses a high output characteristic when compared with such as a nickel-hydrogen battery and a lead battery, a lithium secondary battery recently draws an attention as a high output power source for such as an electric vehicle and a hybrid type electric vehicle. For a lithium secondary battery used in a hybrid type electric vehicle, as its important factor, such a battery is desired that provides a high input and output, a high safety, a high initial charge and discharge efficiency and long lifetime characteristic at the same time.

In the past, although such as lithium metal and alloys were used as an active anode material used in the lithium secondary battery, since dendrite precipitates in accordance with repetition of cycles, cycle characteristic and safety are deteriorated, for this reason, carbon materials are recently studied actively as an alternative of the active anode materials.

From the past, many patents noticing the physical properties of the carbon materials have been issued. Patent document 1 discloses a carbon material having a structure in which volume of pores of not more than 5 nm in graphite occupies not less than 60% of the total volume of pores.

On one hand, patent document 2 discloses a carbon material in which a ratio of pore volumes is defined. Patent document 2 discloses a carbon material in which when assuming a volume of pores of 4~10 nm is as V3 and a volume of pores of 30~100 nm is as V4, V4/V3 is defined as 2.2~3.0.

[Patent document 1] JP-A-9-7597
[Patent document 2] JP-A-2003-272625

SUMMARY OF THE INVENTION

Carbon materials are classified into graphite series of which face interval $d_{002}$ of carbon 002 face is not less than 0.335 nm and less than 0.340 nm and soft carbon series in which $d_{002}$ is not less than 0.340 nm and not more than 0.390 nm.

Since the graphite series possesses a high crystallinity in comparison with the soft carbon series, the graphite series show an excellent initial charge and discharge characteristic, however, on one hand, when intercalating lithium, the crystal lattices thereof swell to swell the electrode, which arises a problem with regard to lifetime characteristic.

Further, due to the crystal structure of the graphite, since the occlusion and emission ports of lithium ions are limited at the edge portions of the graphite and the lithium ions are hardly occluded and emitted at the basal faces thereof, the charge and discharge characteristic thereof tends to decrease.

On the other hand, since the crystal lattices of the soft carbon series hardly swell in comparison with the graphite series, the electrode thereof hardly swells likely, which shows an advantage with regard to the lifetime characteristic. Further, due to substantially no orientation thereof, since the intercalation and de-intercalation of lithium ions are caused at the entire faces, an excellent charge and discharge characteristic is obtained.

However, on one hand, since the graphite possesses a low crystallinity, the lithium ions are trapped at portions having irregular structures, which deteriorates the initial charge and discharge efficiency.

The present inventors have concluded that it is desirable to use a soft carbon that hardly swells and shrinks and shows an excellent lifetime characteristic as an active anode material. However, when such soft carbon is used, since the soft carbon shows a large irreversible capacity, which deteriorates the initial charge and discharge efficiency. Namely, when the irreversible capacity is large, not only the energy density of a battery is reduced but also when producing a battery having a same capacity, the necessary amount for the active cathode material increases.

As the result of investigation on a method of reducing the irreversible capacity for a lithium secondary battery, the present inventors found out that it is one measure to decrease a specific surface area of the active anode material of carbon so as to suppress SEI (solid electrolyte interface) formation caused by a reaction with the electrolyte. However, when the specific surface area is decreased, a contacting surface area between the electrolyte and the active material reduces, which arises a problem of deteriorating the charge and discharge characteristic thereof.

The present invention is characterized in that an anode material is a soft carbon of which face interval $d_{002}$ is not less than 0.340 nm and not more than 0.370 nm and with regard to volume of pores included in the soft carbon when assuming that a total volume of pores having diameters from not less than 1 nm to less than 10 nm is as V1 and a total volume of pores having diameters from not less than 10 nm to less than 100 nm is as V2, V1/V2 is not more than 0.2.

Further, the present invention is characterized in that a specific surface area of the soft carbon is from not less than 1 $m^2/g$ to not more than 10 $m^2/g$.

Further, the present invention is characterized in that in a lithium secondary battery in which a cathode capable of lithium occlusion and emission and an anode capable of lithium occlusion and emission are formed via an electrolyte, the anode is a soft carbon of which face interval $d_{002}$ is not less than 0.340 nm and not more than 0.370 nm and with regard to volume of pores included in the soft carbon when assuming that a total volume of pores having diameters from not less than 1 nm to less than 10 nm is as V1 and a total volume of pores having diameters from not less than 10 nm to less than 100 nm is as V2, V1/V2 is not more than 0.2.

By means of the present invention, a lithium secondary battery with a small irreversible capacity can be provided without deteriorating its charge and discharge characteristic.

DESCRIPTION OF THE PREFERRED EMBODIMENTS

Figure 1:
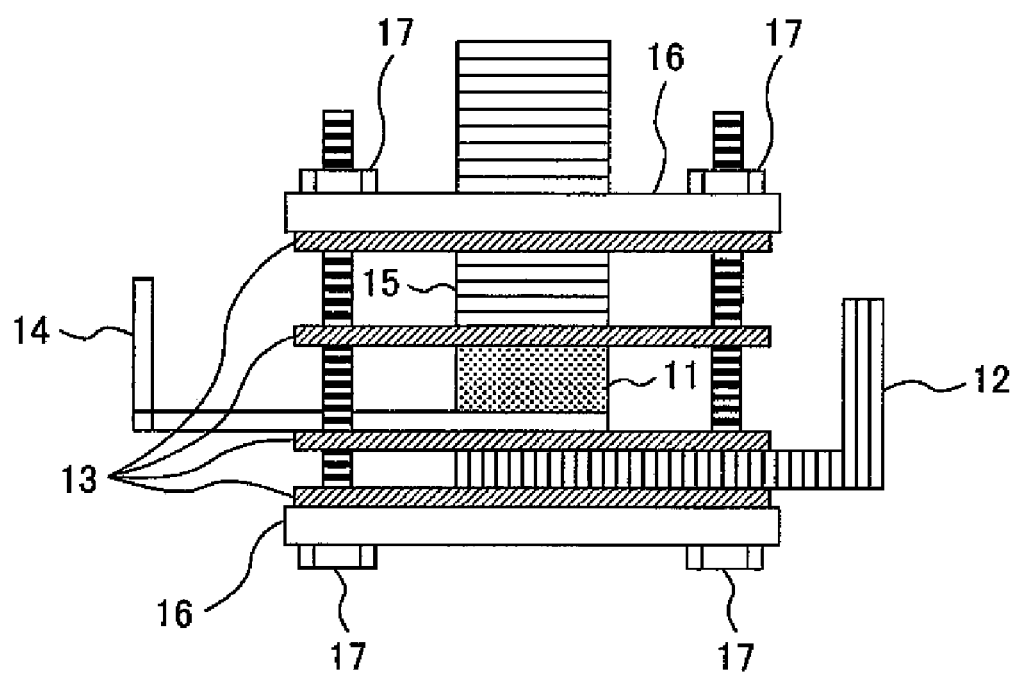
FIG. 1 is a schematic diagram showing an example of a triple electrode type test use model cell used in the present invention.

As explained previously, although by increasing the specific surface area through increasing the volume of pores, the charge and discharge characteristic is improved, which on one hand causes an increase of the irreversible capacity. The cause of such increase is considered that the volume of pores that is hard to contribute to the charging and discharging increases in accordance with the increase of the specific surface area.

Therefore, a relationship between the volume of pores V2 having diameters from not less than 10 nm to less than 100 nm which contributes the charging and discharging and the volume of pores V1 having diameters from not less than 1 nm to less than 10 nm which is hard to contribute to the charging and discharging is noticed, and the present inventors found out a relationship between V1 and V2 which suppresses the volume of pores that is hard to contribute to the charging and discharging, while securing the specific surface area for maintaining the charge and discharge characteristic.

More concretely, by decreasing the pores having diameters from not less than 1 nm to less than 10 nm which are hard to contribute to the charging and discharging due to difficulty of in and out of lithium ions with respect to the pores having diameters from not less than 10 nm to less than 100 nm which contribute the charging and discharging, the specific surface area (volume of pores) affected by the pores having diameters from not less than 1 nm to less than 10 nm is selectively decreased, thereby a reduction of the irreversible capacity and a rise of the initial charge and discharge efficiency are realized without deteriorating the charge and discharge characteristic.

It is acceptable if the ratio V1/V2 of the pore volumes of the carbon material is not more than 0.2, particularly, a ratio not more than 0.12 is preferable and further particularly, a ratio not more than 0.08 is more preferable.

The pores having diameters from not less than 10 nm to less than 100 nm relating to V2 can contribute to the charging and discharging, on the other hand, since the diameters of the pores having diameters from not less than 1 nm to less than 10 nm relating to V1 are too small, such as the electrolyte and ions cannot penetrate and migrate therein smoothly during high speed charging and discharging, therefore, an increase of the specific surface area by these pores contributes little to the charging and discharging.

However, since lithium ions can penetrate therein in a certain time span and SEI formation is come out which affects the irreversible capacity. For this reason, when lowering the V1/V2, the initial charge and discharge efficiency can be enhanced without deteriorating the charge and discharge characteristic. Further, the pore volume can be measured by subjecting adsorption isothermal lines obtained by 77K nitrogen adsorption measurement to BJH (Barett-Joyner-Halenda method) analysis.

At the same time, it is desirable that the face interval $d_{002}$ of carbon 002 face in the carbon material is not less than 0.340 nm and not more than 0.370 nm, particularly, from not less than 0.340 nm to not more than 0.360 nm is preferable, further, from not less than 0.340 nm to not more than 0.350 nm is more preferable.

When $d_{002}$ is less than 0.340, the crystal lattices thereof swell during intercalation and de-intercalation of lithium ions which swells the electrode, which arises difficulty with regard to lifetime characteristic and safety, further, because of the existence of orientation, the intercalation and de-intercalation of lithium ions are not caused at the basal faces but caused only at the edges, which tends to lower the charge and discharge characteristic. In addition, because of a high reactivity with the electrolyte at the edge portions the orientation affects adversely to the lifetime characteristic.

Further, when $d_{002}$ is above 0.370 nm, the crystallinity lowers, the initial charge and discharge efficiency is deteriorated and at the same time the true density of the carbon material tends to lower.

The face interval of the carbon 002 face can be calculated according to Bragg's equation after profile fitting of peaks of respective samples obtained by making use of an X ray diffraction apparatus.

Although a method of producing an anode carbon material used for a lithium secondary battery according to the present invention is not limited in particular, if the anode material is a soft carbon of which face interval $d_{002}$ of carbon 002 face determined by an X ray diffraction apparatus is not less than 0.340 nm and not more than 0.370 nm and a ratio of volume V1 of pores having diameters from not less than 1 nm to less than 10 nm to volume V2 of pores having diameters from not less than 10 nm to less than 100 nm determined by subjecting adsorption isothermal lines obtained by 77K nitrogen adsorption measurement to BJH analysis, in that the V1/V2 is not more than 0.2.

The anode material can be produced, for example, after producing a soft carbon of which face interval $d_{002}$ of carbon 002 face determined by an X ray diffraction apparatus is not less than 0.340 nm and not more than 0.370 nm as a core material, by processing the core material so that the ratio V1/V2 is not more than 0.2, wherein the volume of pores having diameters from not less than 1 nm to less than 10 nm is V1 and the volume of pores having diameters from not less than 10 nm to less than 100 nm is V2.

Although a method of producing a carbon core material for an anode carbon material used for a lithium secondary battery according to the present invention is not limited in particular, if a soft carbon of which face interval $d_{002}$ of carbon 002 face determined by an X ray diffraction apparatus is not less than 0.340 nm and not more than 0.370 nm is obtained from the carbon core material, however, for example, a carbon material serving as a raw material can be produced in such a manner that such as thermoplastic resin, naphthalene, anthracene, phenanthrorene, coal tar and tar pitch are heat treaded in advance by a machine such as autoclave and crushed, thereafter, calcinated under an inert atmosphere of not less than 800° C. and further crushed to adjust the grain size thereof. The temperature of the heat treatment performed in advance has to be determined depending on the material to be treated, for example, in the case of coal series coal tar and petroleum series coal tar, a temperature of not less than 400° C. and not more than 450° C. is desirable.

A method of rendering V1/V2 of a carbon material serving as a core material to not more than 0.2 is not limited particularly, if V1/V2 assumes not more than 0.2, however, for example, such carbon material can be produced by such as a method of performing a thermal oxidation processing under oxidation atmosphere, a method in which a blended liquid formed by dissolving or dispersing an organic material with remaining carbonaceous material resulted from a heat treatment in a solvent and a carbon material are mixed, the solvent is removed to form a mixture of carbon and the organic material and thereafter the mixture is subjected to a heat treatment under an inert atmosphere to carbonize the organic material, a CVD (chemical vapor deposition) in which hydrocarbon such as methane is evaporated on a carbon material under heating and a solid phase mixing method in which carbon grains and an organic compound are mixed each other in solid state, a mechanical energy is applied to the mixture, thereafter the mixture is subjected to heat treatment to carbonized the same. In any cases, it is desirable to adjust the grain size after a pore reduction process by performing a disintegration and classification.

Further, it is desirable that an average grain diameter (50% D) of the anode carbon material according to the present invention determined with a laser diffraction/dispersion type grain size distribution measurement apparatus is to be not less than 3 µm and not more than 30 µm, preferably to be not less than 3 µm and not more than 25 µm, and further, more preferably to be not less than 5 µm and not more than 20 µm. When the average grain size exceeds over 30 µm, since an irregularity is likely to be caused on an electrode, the battery characteristic is lowered as well as a length of ion diffusion into an active material prolongs, which arise a problem with regard to the charge and discharge characteristic, and when the average grain size is less than 3 µm, since the grains are hardly crushed, a problem of difficulty in increasing density arises. Further, the grain size distribution can be measured with a laser diffraction/dispersion type grain size distribution measurement apparatus after a sample is dispersed in purified water containing surface active agent and the average grain size is calculated from the measured grain size distribution as 50% D.

Further, it is desirable that a specific surface area of the anode carbon material according to the present invention determined from adsorption isothermal lines obtained by 77K nitrogen adsorption measurement by making use of BET (Brunauer-Emmet-Teller) method is to be not less than 1 m$^2$/g and 10 m$^2$/g. When the specific surface area is less than 1 m$^2$/g, since the reaction area between the active material and lithium ions decreases, the charge and discharge characteristic is deteriorated, and when the specific surface area exceeds over 10 m$^2$/g, since the reaction with the electrolyte is likely to occur, the irreversible capacity increases as well as the lifetime characteristic is deteriorated.

A method of producing the anode is not limited in particular, however, for example, the above mentioned carbon serving as an anode active material added of a binding agent dissolved or dispersed in a proper solvent is sufficiently kneaded and dispersed by making use of a general kneading and dispersing method such as a ball mill and a planetary mixer and an anode mixing slurry is produced. Thereafter, the anode mixing slurry is coated on a metal foil such as copper by making use of a coating machine, after the coating the same is vacuum dried at a temperature of about 120° C. and the same is cut or punched to a desired size after compression molding to form an anode.

In the above, if necessary, it is desirable to add a conductive assistant. Although the conductive assistant is not limited in particular, however, for example, powdered graphite having a high electrical conductivity, flaky graphite or amorphous carbon such as carbon black can be used and any combinations thereof can be also acceptable. It is desirable that a content amount of the conductive assistant is desirable to be not less than 0 weight % and not more than 15 weight % with regard to 100 weight % totaling the anode material used for the lithium ion secondary battery according to the present invention and the conductive assistant. When the content amount exceeds over 15 weight %, the initial charge and discharge efficient extremely decreases.

Although organic series binding agents serving as the above binding agent are not limited in particular, however, for example, such as styrene-butadiene copolymer, ethylene type unsaturated carbonic acid ester such as methyl(meta)acrylate, ethyl(meta) acrylate, buthyl(meta)acrylate, (meta)acrylonitrile, hydroxyethyl (meta)acrylate, ethylene type unsaturated carbonic acid such as acrylic acid, methacrylic acid, itaconic acid, fumaric acid, maleic acid and a high polymer compound having a large ion conductivity such as poly fluoride vinylidene, poly ethylene oxyside, poly epichlorohydrin, poly phosphasene, poly acrylonitrile are enumerated. It is desirable that a content amount of the organic series binding agent is desirable to be not less than 1 weight % and not more than 20 weight % with regard to 100 weight % totaling the anode material used for the lithium ion secondary battery according to the present invention and the organic series biding agent. When the content amount is less than 1 weight %, the electrode sometimes peels out, and when the content amount exceeds over 20 weight %, such as the charge and discharge characteristic as well as the lifetime characteristic are deteriorated.

For the production of the cathode, a cathode active material added of a binding agent dissolved or dispersed in a proper solvent is sufficiently kneaded and dispersed by making use of a general kneading and dispersing method such as a ball mill and a planetary mixer to produce a cathode mixing slurry. Thereafter, the cathode mixing slurry is coated on a metal foil such as aluminum by making use of a coating machine, after the coating the same is vacuum dried at a temperature of about 120° C. and the same is cut or punched to a desired size after compression molding to form a cathode.

As a cathode active material, a complex compound of lithium and transition metal having a crystalline structure such as of spinel type cubic system, lamellar type hexagonal system, olivine type rhombic system, and triclinic system is used. From a view point of high out put as well as long lifetime, a lamellar type hexagonal system containing lithium and at least cobalt, manganese and nickel is desirable, in particular, $LiMn_aNi_bCo_cM_dO_2$ is preferable (wherein, M is at least one selected from a group consisting of Fe, V, Ti, Cu, Al, Sn, Zn, Mg and B, and preferably one of Al, B and Mg, further, $0 \leq a \leq 0.6$, $0.3 \leq b \leq 0.7$, $0 \leq c \leq 0.4$, $0 \leq d \leq 0.1$). An average grain size of the cathode active material is desirable to be not more than 10 µm.

Lithium salt is for supplying lithium ions that migrate in the electrolyte during charging and discharging of a battery, such as $LiClO_4$, $LiCF_3SO_3$, $LiPF_6$, $LiBF_4$ and $LiAsF_6$ can be used alone or in combination of not less than two thereof. As an organic solvent, it is desirable to use straight chain or cyclic carbonate series as the main component and to the main component ester series and ethyl series can be mixed. As the carbonate series, ethylene carbonate (EC), propylene carbonate, butylene carbonate, dimethyl carbonate (DMC), diethyl carbonate (DEC) and methyl ethyl carbonate are enumerated. These are used alone or in combination to form the solvent.

If a separator can prevent shorting between a cathode and an anode, the separator is not limited in particular, however, for example, nonwoven fabric, cloth, film with pores containing poly olefin such as poly ethylene and poly propylene as its main component, and combination thereof can be used for the separator.

A lithium ion secondary battery according to the present invention can be obtained, for example, in such a way that an anode and a cathode used for the lithium ion secondary battery according to the present invention are disposed in opposing manner via a separator and electrolyte is impregnated thereinto.

Although the structure of the lithium ion secondary battery according to the present invention is not limited in particular, however, the cathode, the anode and the separator isolating these are normally wound into a wound type electrode group for use or laminated into a laminated type electrode group for use.

The lithium ion secondary battery according to the present invention as has been explained above can decrease the irreversible capacity and heighten the initial charge and discharge efficiency without deteriorating the charge and discharge characteristic in comparison with one using a conventional carbon material as the anode.

Herein below, the present invention will be explained based on embodiments. However, the embodiments are merely examples and the present invention is not necessarily limited to the embodiments.

Further, in the following, a volume of pores having pore diameters of 4~10 nm is assumed as V3 and a volume of pores having pore diameters of 30~100 nm is assumed as V4.

At first, carbon materials used for anode active material for the present invention and for comparative examples were produced.

Embodiment 1

For synthesizing a core material for the anode active material, with an autoclave coal series coal tar was heat treated at 400° C. to obtain a raw coke. After crushing the raw coke, the crushed raw coke was calcinated at 1200° C. under an inert atmosphere and a coke lump having graphite inter layer distance ($d_{002}$) of 0.345 nm was obtained. The coke lump was crushed by making use of an impact crushing machine with a classifier and coarse powders were removed with a sieve of 300 mesh to obtain carbon grains.

The carbon grains of 100 weight % were simply mixed with pitch of 15 weight % under an atmosphere of 100° C. and was temperature raised up to 1100° C. at a rate of 20° C./hour, thereafter, the same was kept one hour to obtain the carbon grains for use. The obtained carbon grains were disintegrated by a cutter mill, thereafter, coarse powders were removed with a sieve of 300 mesh to obtain carbon grains. A ratio of volume V1 of pores having diameters from not less than 1 nm to less than 10 nm in the produced carbon material with respect to volume V2 of pores having diameters from not less than 10 nm to less than 100 nm therein, in that V1/V2=0.074 and the graphite inter layer distance ($d_{002}$) thereof was 0.345 nm.

Embodiment 2

With the same process as in the embodiment 1 except that the charged amount of pitch for the simple mixing was altered from 15 weight % to 10 weight %, powders of carbon material was produced. A ratio of volume V1 of pores having diameters from not less than 1 nm to less than 10 nm in the produced carbon material with respect to volume V2 of pores having diameters from not less than 10 nm to less than 100 nm therein, in that V1/V2=0.111 and the graphite inter layer distance ($d_{002}$) thereof was 0.345 nm.

Comparative Example 1

With the same process as in the embodiment 1 except that the charged amount of pitch for the simple mixing was altered from 15 weight % to 30 weight %, powders of carbon material was produced. A ratio of volume V1 of pores having diameters from not less than 1 nm to less than 10 nm in the anode active material with respect to volume V2 of pores having diameters from not less than 10 nm to less than 100 nm therein, in that V1/V2=0.242 and the graphite inter layer distance ($d_{002}$) thereof was 0.345 nm.

Embodiment 3

The carbon grain of 100 weight %, pitch of 15 weight % and toluene of 30 weight % that was added so that the weight % of pitch assumes 15 weight % were mixed. after sufficiently mixing the mixture, the toluene was vacuum removed under an atmosphere of 100° C., and a complex body of carbon grain/pitch was produced. The produced carbon grains/pitch complex body was temperature raised up to 1100° C. at a rate of 20° C./hour, thereafter, the same was kept one hour to obtain carbon grains. The obtained carbon grains were disintegrated by a cutter mill, thereafter, coarse powders were removed with a sieve of 300 mesh to obtain carbon grains. The carbon grains was temperature raised up to 900° C. at a rate of 20° C./hour, thereafter, the same was kept one hour to obtain carbon grains. A ratio of volume V1 of pores having diameters from not less than 1 nm to less than 10 nm in the produced carbon material with respect to volume V2 of pores having diameters from not less than 10 nm to less than 100 nm therein, in that V1/V2=0.115 and the graphite inter layer distance ($d_{002}$) thereof was 0.345 nm.

Comparative Example 2

With the same process as in the embodiment 3 except that the raised temperature after immersing the carbon grains in tar (softening point of 80° C.) in 3 hours was altered from 900° to 600° C., carbon grains was obtained. A ratio of volume V1 of pores having diameters from not less than 1 nm to less than 10 nm in the anode active material with respect to volume V2 of pores having diameters from not less than 10 nm to less than 100 nm therein, in that V1/V2=0.320 and the graphite inter layer distance ($d_{002}$) thereof was 0.345 nm.

Comparative Example 3

The grains were used as they are without subjecting the same to the post crushing processing. A ratio of volume V1 of pores having diameters from not less than 1 nm to less than 10 nm in the anode active material at that instance with respect to volume V2 of pores having diameters from not less than 10 nm to less than 100 nm therein, in that V1/V2=0.360 and the graphite inter layer distance ($d_{002}$) thereof was 0.345 nm.

Subsequently, an evaluation of physical properties of the anode materials used in the embodiments and the comparative examples was performed.

The pore volumes of the carbon materials serving as the anode active materials of the lithium ion secondary battery according to the present invention were determined in such a manner that after vacuum drying the carbon materials at 120° C. for three hours, adsorption isothermal lines of the carbon materials were measured by making use of nitrogen adsorption at 77K in an equilibrium time of 300 sec with BELSORP-mini, a product of Japan Bell CO. Ltd. and the measured adsorption isothermal lines were analyzed with BJH method. From the pore volumes determined according to the above method, V1/V2 representing the ratios of volume V1 of pores having diameters from not less than 1 nm to less than 10 nm in the anode active materials with respect to volume V2 of pores having diameters from not less than 10 nm to less than 100 nm therein were determined. The results are shown in Table 1.

The face interval $d_{002}$ of carbon 002 face of the carbon materials according to the present embodiments were measured with an X ray diffraction apparatus RU200B, a product of RIGAKU Corporation. Cu was used for the X ray source and the diffraction angle was corrected with Si. The face interval $d_{002}$ of the carbon 002 face can be calculated according to Bragg's equation after performing profile fitting of the peaks obtained by the measurement.

The grain size (50% D) of the carbon materials according to the present embodiments was investigated with a laser diffraction/dispersion type grain size distribution measurement apparatus LA-920, a product of Horiba Seisakusyo. As the light source, He—Ne laser of 1 mW was used and the dispersion medium was formed by adding two drops of a surface active agent to ion exchange water. The dispersion medium was subjected in advance to ultrasonic processing for more than 5 minutes and the measurement was performed while further subjecting the dispersion medium to the ultrasonic processing during the measurement so as to prevent aggregation. The accumulated 50% grain diameters (50% D) of the measurement result were determined as average grain diameters. The results are shown in Table 1.

Subsequently, triple electrode type test use cells were produced by making use of the carbon materials used for the embodiments and the comparative examples.

In FIG. 1, a schematic diagram of a triple electrode type test use cell used for the measurement of the present embodiments is shown. In FIG. 1, 11 shows an anode, 12 a Li metal (counter electrode), 13 a separator, 14 a Cu current collector, 15 a Li metal (reference electrode), 16 a SUS jig and 17 a nut. In the present embodiment, the lithium metal is used for the cathode so as to correctly measure the initial charge and discharge efficiency and the charge and discharge characteristic of the anode.

At first, the anode was produced. To an active material of 85 weight % serving as the anode active material, acetylene black of 6.7 weight % serving as the conductive agent and a solvent formed in advance like the cathode by dissolving PVDF of 8.3 weight % serving as the binding agent in NMP were added and further mixed to obtain anode mixture slurry. Like the same process as in the cathode, the slurry was coated uniformly and equally on one face of rolled copper foil having thickness of 10 μm. After the coating the same was compression molded with a hand press machine so that the electrode density assumes 1.15 g/cc and the mold was punched to 16 φ to form the anode.

As shown in FIG. 1, by making use of the produced anode and a metal lithium, a triple electrode test use cell was produced. From the bottom, on a square type SUS jig a separator, a Li metal, a separator, a Cu current collector, an anode, a separator, a lithium metal and a separator were piled in this order and these were uniformly fastened by nuts with a torque wrench to secure the same. Herein, the separators, the cathode and the anode that had been sufficiently immersed in an electrolyte formed by dissolving $LiPF_6$ of 1 mol/liter in a mixture solvent of EC, DMC and DEC in a volume ratio of 1:1:1 were used. These cells were produced in a glow box under Ar atmosphere and were connected in a glass cell container with terminals. In this instance, electrolyte of 1 cc was introduced in the glass cell. In order to keep air tightness of the glass cell vacuum grease was coated at the joint portion between the cap and the main body thereof to thereby keep electrolytic atmosphere.

The initial charging and discharging efficiency was measured in the following manner.

At first, the produced glass cell was charged up to 0V with a current corresponding to 0.3 at around room temperature (25° C.), thereafter, a constant voltage charging at 0V was performed until the current reaches 0.03 C to determine a charge capacity. Thereafter, after 30 minutes rest, a constant current discharge was performed up to 1.5 V with a constant current corresponding to 0.3 C to determine a charge capacity. An initial charge and discharge efficiency is defined as (discharge capacity/charge capacity)×100. The results are shown in Table 1.

Subsequently, the charge and discharge characteristic was measured. A glass cell produced in the like manner as above was charged up to 0V with a current corresponding to 0.3 C at around room temperature (25° C.), thereafter, a constant voltage charging at 0V was performed until the current reaches 0.03 C, and thereafter, after 30 minutes rest, a constant current discharge was performed up to 1.5 V with a constant current corresponding to 0.3 C. The above operation was performed in three cycles and the discharge capacity at the third cycle was determined as a capacity at 0.3 C. Thereafter, the glass cell was again charged up to 0V with a current corresponding to 0.3, thereafter, a constant voltage charging at 0V was performed until the current reaches 0.03 C, and thereafter, after 30 minutes rest, a discharge was performed with a current corresponding to 10 C to determine a capacity at 10 C. A charge and discharge characteristic is defined as (discharge capacity at 0.3 C/charge capacity at 10 C)×100. It shows that the higher the value thereof the better the charge and discharge characteristic is. The results are shown in Table 1.

As will apparent from Table 1, the lithium secondary batteries of embodiments 1~3 enhance the initial charge and discharge efficiency while maintaining the charge and discharge characteristic in comparison with the comparative examples.

TABLE 1

|  | Emb. 1 | Emb. 2 | Emb. 3 | Comp. 1 | Comp. 2 | Comp. 3 |
|---|---|---|---|---|---|---|
| V1/V2 | 0.074 | 0.111 | 0.115 | 0.242 | 0.320 | 0.360 |
| V4/V3 | 15.1 | 9.68 | 9.28 | 4.12 | 2.99 | 2.87 |
| Average grain diameter (μm) | 10.77 | 9.35 | 11.08 | 10.43 | 10.25 | 9.21 |
| Specific surface area (g/cc) | 1.82 | 2.19 | 1.92 | 4.36 | 5.58 | 6.31 |
| Initial charge, discharge efficiency (%) | 79.9 | 78.8 | 79.0 | 74.8 | 73.8 | 70.9 |
| Charge capacity at 0.3 C (mAh) | 1.58 | 1.37 | 1.54 | 1.51 | 1.57 | 1.52 |
| Discharge capacity at 10 C (mAh) | 1.47 | 1.27 | 1.42 | 1.41 | 1.46 | 1.41 |
| Charge, discharge characteristic | 93.0 | 92.7 | 92.2 | 93.4 | 93.0 | 92.8 |

As has been explained hitherto, the carbon material used for the anode active material for the lithium secondary battery according to the present invention contributes for producing a lithium secondary battery with an excellent initial charge and discharge efficiency in comparison with a conventional soft carbon material.

The invention claimed is:

1. An anode material used for a lithium secondary battery characterized in that the anode material is a soft carbon of which face interval $d_{002}$ is not less than 0.340 nm and not more than 0.370 nm, a pore volumes ratio V1/V2 is not more than 0.2, where a volume of pores V1 included in the soft carbon have diameters from not less than 1 nm to less than 10 nm and a volume of pores V2 included in the soft carbon have diameters from not less than 10 nm to less than 100 nm, a specific surface area of the soft carbon is from not less than 1 $m^2/g$ to not more than 10 $m^2/g$, and an average grain diameter (50% D of the soft carbon is not less than 3 μm and not more than 30 μm.

2. A lithium secondary battery in which a cathode capable of lithium occlusion and emission and an anode capable of lithium occlusion and emission are formed via an electrolyte, characterized in that the anode is a soft carbon of which face interval $d_{002}$ is not less than 0.340 nm and not more than 0.370 nm, a pore volumes ratio V1/V2 is not more than 0.2, where a volume of pores V1 included in the soft carbon have diameters from not less than 1 nm to less than 10 nm and a volume of pores V2 included in the soft carbon have diameters from not less than 10 nm to less than 100 nm, a specific surface area of the soft carbon is from not less than 1 m$^2$/g to not more than 10 m$^2$/g, and an average grain diameter (50% D) of the soft carbon is not less than 3 μm and not more than 30 μm.

3. An anode material used for a lithium secondary battery according to claim 1, wherein the pore volumes ratio V1/V2 of the soft carbon is not more than 0.12.

4. An anode material used for a lithium secondary battery according to claim 1, wherein the pore volumes ratio V1/V2 of the soft carbon is not more than 0.08.

5. A lithium secondary battery according to claim 2, wherein the pore volumes ratio V1/V2 of the soft carbon is not more than 0.12.

6. A lithium secondary battery according to claim 2, wherein the pore volumes ratio V1/V2 of the soft carbon is not more than 0.08.

7. An anode material for a lithium secondary battery, the anode material comprising a soft carbon of which face interval $d_{002}$ is not less than 0.340 nm and not more than 0.370 nm, a pore volumes ratio V1/V2 is not more than 0.2, where a volume of pores V1 included in the soft carbon have diameters from not less than 1 nm to less than 10 nm and a volume of pores V2 included in the soft carbon have diameters from not less than 10 nm to less than 100 nm, and an average grain diameter (50% D) of the soft carbon is not less than 3 μm and not more than 30 μm.

8. An anode material used for a lithium secondary battery according to claim 7, wherein the pore volumes ratio V1/V2 of the soft carbon is not more than 0.12.

9. An anode material used for a lithium secondary battery according to claim 7, wherein the pore volumes ratio V1/V2 of the soft carbon is not more than 0.08.

* * * * *